(12) United States Patent
Smith (10) Patent No.: US 12,522,064 B2
(45) Date of Patent: Jan. 13, 2026

(54) DRIVE SHAFT ASSEMBLY FOR DRIVEN ACCESSORY DEVICES

(71) Applicant: The Boeing Company, Arlington, VA (US)

(72) Inventor: Arnold Smith, Everett, WA (US)

(73) Assignee: The Boeing Company, Arlington, VA (US)

( * ) Notice: Subject to any disclaimer, the term of this patent is extended or adjusted under 35 U.S.C. 154(b) by 328 days.

(21) Appl. No.: 18/329,766

(22) Filed: Jun. 6, 2023

(65) Prior Publication Data
US 2024/0408961 A1    Dec. 12, 2024

(51) Int. Cl.
*B60K 25/06* (2006.01)
*F16D 9/02* (2006.01)

(52) U.S. Cl.
CPC .............. *B60K 25/06* (2013.01); *F16D 9/02* (2013.01); *Y10T 29/49993* (2015.01)

(58) Field of Classification Search
CPC ...... B60K 25/06; F16D 9/02; Y10T 29/49993
USPC ............................. 464/31; 192/82 T; 29/530
See application file for complete search history.

(56) References Cited

U.S. PATENT DOCUMENTS 3,193,068 A  *  7/1965  Greve ...................... F16D 9/02
                                                    464/31

* cited by examiner

*Primary Examiner* — Greg Binda
(74) *Attorney, Agent, or Firm* — Joseph M. Butscher; The Small Patent Law Group LLC (57) ABSTRACT

A drive shaft assembly includes an outer shaft, an inner shaft, and an interface medium. The outer shaft defines a central channel. The inner shaft extends into the central channel and defines a clearance gap between an interior surface of the outer shaft and an exterior surface of the inner shaft. The interface medium is disposed in the clearance gap and rotationally couples the outer shaft and the inner shaft in an operational state of the drive shaft assembly. In response to a temperature of the drive shaft assembly exceeding a threshold temperature, the interface medium at least partially melts and rotationally uncouples the outer shaft and the inner shaft in a fault state of the drive shaft assembly.

20 Claims, 5 Drawing Sheets

DRIVE SHAFT ASSEMBLY FOR DRIVEN ACCESSORY DEVICES

FIELD OF THE DISCLOSURE

Embodiments of the present disclosure generally relate to accessory devices mechanically driven by prime mover devices, such as accessory devices disposed onboard an aircraft.

BACKGROUND OF THE DISCLOSURE

Various devices may be mechanically connected to a fuel-combustion engine and driven by the engine such that operation of the engine powers the devices. For example, a gear box of an engine may be mechanically connected to a device, referred to herein as an accessory device, via a mechanical linkage. The mechanical linkage may include a drive shaft. The gear box may rotate the drive shaft, and the drive shaft may transfer the rotation to one or more components of the accessory device to power operation of the accessory device. Because the accessory devices are powered by the engine via a mechanical linkage, such accessory devices are referred to as engine-driven. Example engine-driven accessory devices can include pumps (e.g., fuel pump, hydraulic pump, oil pump, etc.), generators, air compressors, and the like.

A drawback of at least some existing engine systems is that the engine-driven accessory devices are permanently coupled to the engine via the respective mechanical linkages, even in the event of a fault. For example, it is possible for an accessory device to overheat due to damage, wear, and/or excessive rotational speed. The overheating condition may be detected via sensors. In response, a control system may deactivate the overheating accessory device to at least temporarily suspend the device from operation (e.g., producing output). Optionally, active cooling may be applied to the overheating accessory device in an attempt to depress the temperature down to a desired temperature range. But, while these remedial actions are performed, the overheating accessory device is still mechanically connected to the engine gear box and continues to receive rotational torque. The continued torque applied to the accessory device may exacerbate the problem by generating more heat. The additional heat may increase the temperature of the overheating accessory device and/or require more active cooling (and more time) to control the temperature of the accessory device.

Overheating accessory devices may cause collateral damage, particularly if the temperature is not reduced to the desired temperature range in a timely manner. For example, an overheating engine-driven hydraulic pump may leak hydraulic fluid, which can contaminate the gearbox of the engine. The fluid-contaminated gearbox may also require substantial maintenance upon landing to address the gearbox and the hydraulic system. Another risk is that the leaked hydraulic fluid may trigger an emergency engine shut-down (referred to as Engine In-Flight Shutdown) during a flight.

SUMMARY OF THE DISCLOSURE

A need exists for a system and method to provide a drive shaft assembly that can simply and reliably decouple the engine from the accessory device in an overheat condition, to allow the accessory device to cool without interfering with the operation of the engine. With that need in mind, certain embodiments of the present disclosure provide a drive shaft assembly that includes an outer shaft, an inner shaft, and an interface medium. The outer shaft defines a central channel. The inner shaft extends into the central channel of the outer shaft and defines a clearance gap between an interior surface of the outer shaft and an exterior surface of the inner shaft. The interface medium is disposed in the clearance gap and configured to rotationally couple the outer shaft and the inner shaft in an operational state of the drive shaft assembly. In response to a temperature of the drive shaft assembly exceeding a threshold temperature, the interface medium is configured to at least partially melt and rotationally uncouple the outer shaft and the inner shaft in a fault state of the drive shaft assembly.

Certain embodiments of the present disclosure provide a method for selectively coupling a prime mover device to an accessory device. The method includes providing a drive shaft assembly that includes an outer shaft, an inner shaft, and an interface medium. The outer shaft defines a central channel. The inner shaft extends into the central channel of the outer shaft and defines a clearance gap between an interior surface of the outer shaft and an exterior surface of the inner shaft. The interface medium is disposed in the clearance gap and is configured to rotationally couple the outer shaft and the inner shaft in an operational state of the drive shaft assembly. The method includes mechanically coupling one of the inner shaft or the outer shaft to the prime mover device, and mechanically coupling the other of the inner shaft or the outer shaft to the accessory device. In the operational state, rotational torque exerted by the gear box is transmitted via the drive shaft assembly to the accessory device. In response to a temperature of the drive shaft assembly exceeding a threshold temperature, the interface medium is configured to at least partially melt and rotationally uncouple the outer shaft and the inner shaft, such that the drive shaft assembly no longer transmits the rotational torque to the accessory device, in a fault state of the drive shaft assembly.

Certain embodiments of the present disclosure provide an engine drive system that includes a fuel combustion engine, an accessory device, and a drive shaft assembly. The fuel combustion engine includes a gear box. The drive shaft assembly includes an outer shaft, an inner shaft, and an interface medium. The outer shaft defines a central channel therethrough. The outer shaft is mechanically connected to one of the gear box or the accessory device. The inner shaft extends into the central channel of the outer shaft and defines a clearance gap between an interior surface of the outer shaft and an exterior surface of the inner shaft. The inner shaft is mechanically connected to the other of the gear box or the accessory device. The outer shaft includes cavities that are open to the clearance gap and extend radially outward from the clearance gap to respective base surfaces of the cavities. The interface medium is disposed in the clearance gap and is configured to rotationally couple the outer shaft and the inner shaft in an operational state of the drive shaft assembly. In response to a temperature of the drive shaft assembly exceeding a threshold temperature, at least a portion of the interface medium is configured to flow from the clearance gap into the cavities, which rotationally uncouples the outer shaft and the inner shaft in a fault state of the drive shaft assembly.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure describe a drive shaft assembly that extends between a prime mover device and an accessory device to provide rotational torque to the accessory device while in an operational state. The prime mover device may be a gas turbine engine (e.g., a fuel combustion engine), an electric driven pump, a hydraulic driven generator, a motor, or the like. The prime mover device may convert a form of energy to drive rotation of the drive shaft assembly. The drive shaft assembly is designed to automatically transition to a fault state in response to a temperature exceeding a threshold temperature. In the fault state, the drive shaft assembly rotationally decouples the accessory device and the prime mover device, such that the rotational torque provided by the prime mover device is no longer transmitted to the accessory device after the decoupling event.

Decoupling the accessory device from the rotational torque provided by the prime mover device may beneficially allow the accessory device to cool down to a desired temperature in less time and/or with less active cooling than if the accessory device remains rotationally coupled to the prime mover device. In this way, the drive shaft assembly may function as a clutch. In embodiments, the drive shaft assembly may be significantly less complex than known clutch systems. For example, the drive shaft assembly described herein may lack electronic devices of conventional clutch systems, such as sensors, controllers, actuators, and/or the like. The decoupling may be provided by melting of a thermal interface medium within the drive shaft assembly. The drive shaft assembly may be designed to contain the melted thermal interface medium in the flowable (e.g., melted, liquid, etc.) state, to prohibit damage caused by external emission or discharge of the interface medium.

The drive shaft assembly may be installed in various applications. In some examples, the drive shaft assembly may be disposed onboard a vehicle. The vehicle may be an aircraft. Alternatively, the vehicle may be rail vehicle, a bus, an automobile, a truck, a marine vessel, or another type of vehicle. The drive shaft assembly optionally may be used in non-vehicular applications, such as at industrial facilities.

Figure 1:
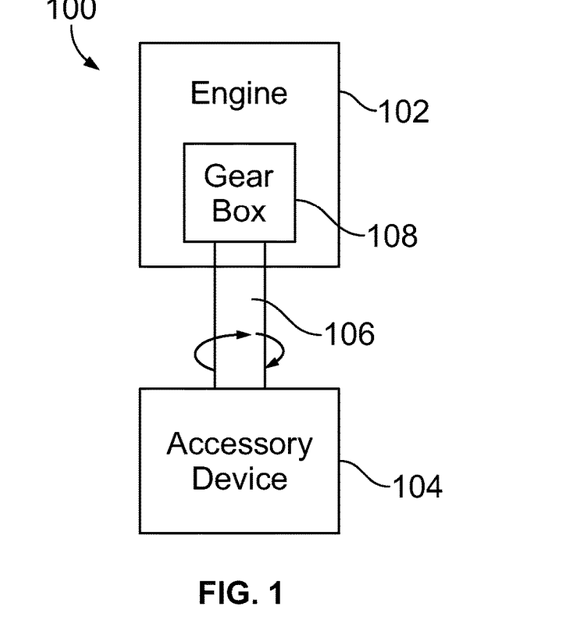
FIG. 1 is a block diagram showing an engine drive system according to an embodiment.

FIG. 1 is a block diagram showing an engine drive system 100 according to an embodiment. The engine drive system 100 includes a fuel combustion engine 102, an engine-driven accessory device 104, and a drive shaft assembly 106. The fuel combustion engine 102 may be a gas turbine engine. The engine may be used to power propulsion of a vehicle on which the engine is located. For example, the engine drive system 100 may be onboard an aircraft. In other examples, the engine drive system 100 may be onboard a truck, an automobile, a rail vehicle, a mining vehicle, or the like. The engine 102 is mechanically connected to the drive shaft assembly 106. In this embodiment, the engine 102 represents a prime mover device that provides rotational torque to the drive shaft assembly 106. For example, the engine 102 may include a gear box 108, and a first shaft of the drive shaft assembly 106 may project from the gear box 108. The first shaft may be secured to the gear box 108 and rotated via the gear box 108 as the engine 102 operates. The drive shaft assembly 106 described herein is not limited to use with fuel combustion engines. In other applications, the drive shaft assembly 106 may be mechanically coupled to a different type of prime mover device, such as an electric driven pump, a motor, a hydraulic driven generator, or the like.

The drive shaft assembly 106 may include a second shaft that is secured to the accessory device 104. The accessory device 104 may be a pump, a generator, an air compressor, or the like. Example pumps may include a fuel pump, a hydraulic pump, an oil pump, or the like. In a first application, the accessory device is a hydraulic pump and is onboard an aircraft. The hydraulic pump may pump hydraulic fluid for controlling various flight control components of the aircraft, such as ailerons, a rudder, and an elevator.

During typical operation, the engine 102 rotates the drive shaft assembly 106, via the gear box 108, and the drive shaft assembly 106 provides drive power to the accessory device 104. The drive power is used by the accessory device 104 to compress a fluid, generate electrical energy, pump a fluid, and/or the like. The drive shaft assembly 106 couples the engine 102 to the accessory device 104 when the drive shaft assembly 106 is in an operational state, such that the drive shaft assembly 106 transfers mechanical force (e.g., torque) from the gear box 108 to the accessory device 104. For example, in the operational state, the first shaft of the drive shaft assembly 106 that is secured to the gear box 108 is rotationally coupled to the second shaft of the drive shaft assembly 106 that is secured to the accessory device 104. The torque exerted on the first shaft by the gear box 108 is transferred via the second shaft to the accessory device 104.

The drive shaft assembly 106 is designed to automatically switch from the operational state to a fault state in response to an overheat condition. For example, when a temperature of the drive shaft assembly exceeds a threshold temperature, the first shaft that is secured to the gear box 108 of the engine 102 rotationally uncouples from the second shaft that is secured to the accessory device 104. In the fault state, the two shafts can rotate relative to one another with little, if any, rotational forces exerted between the two shafts. The rotation of the first shaft by the gear box 108 may no longer drive the rotation of the second shaft coupled to the accessory device 104. When the drive shaft assembly 106 is in the fault state, the drive shaft assembly 106 effectively decouples the accessory device 104 from the engine 102. Decoupling the accessory device 104 from the engine 102 during an overheat condition may allow the accessory device 104 to cool down faster, to cool down to a greater extent, and/or to cool down to a certain temperature using less active cooling than if the torque from the engine 102 is persistently applied to the accessory device 104 even after detecting the overheat condition. By decoupling the accessory device 104, the drive shaft assembly 106 may reduce the risk of collateral damage associated with the overheat condition. For example, if the internal components of the accessory device continue to be driven during a fault state, the moving components may get damaged or damage other components.

Figure 2:
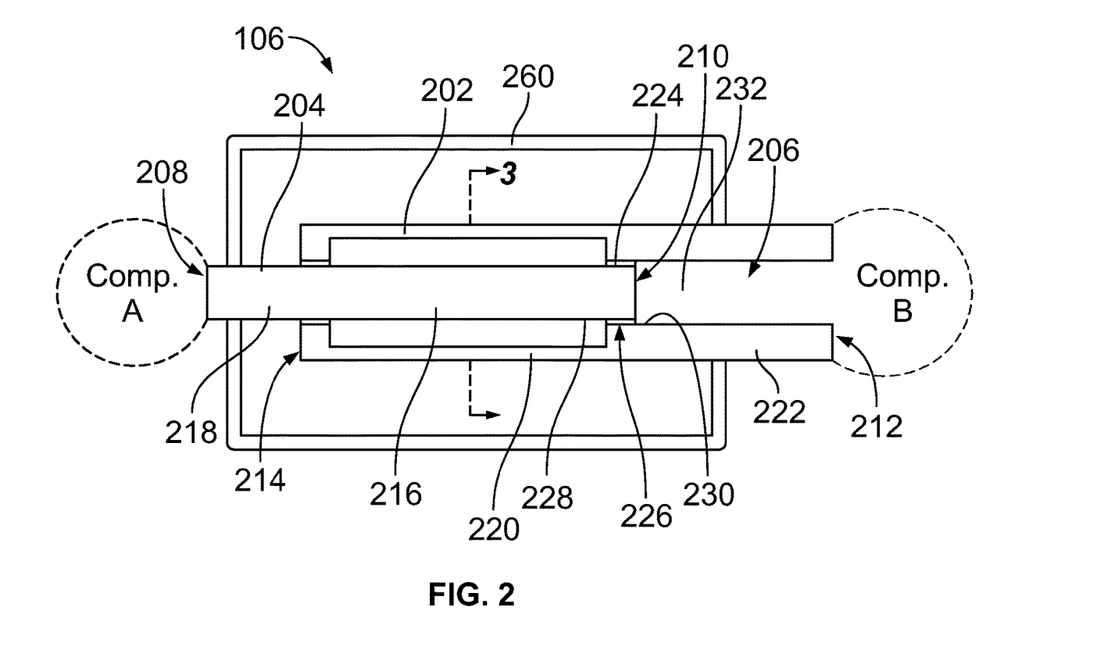
FIG. 2 illustrates a cross-sectional view of a drive shaft assembly of the engine drive system according to an embodiment.

FIG. 2 illustrates a cross-sectional view of the drive shaft assembly 106 according to an embodiment. The cross-section is taken along line 2-2 shown in FIG. 3. The drive shaft assembly 106 may not be drawn to scale for ease of explanation. The drive shaft assembly 106 includes an outer shaft 202 and an inner shaft 204. The outer shaft 202 is hollow and defines a central channel 206 along a length of the outer shaft 202. For example, the central channel 206 may extend for a majority of the length of the outer shaft 202, and optionally may extend the entire length. The inner shaft 204 is received within the central channel 206. The outer and inner shafts 202, 204 may represent the first and second shafts of the drive shaft assembly 106 described with reference to FIG. 1.

The inner shaft 204 has a first end 208 and a second end 210 that is opposite the first end 208. The inner shaft 204 is linear along the entire length in the illustrated embodiment. The first end 208 is mechanically secured to a first component (e.g., Component A). In a first example, the first component may be the engine 102 (e.g., the gear box 108 thereof). In a second example, the first component may be the accessory device 104. The outer shaft 202 has a first end 212 and a second end 214 that is opposite the first end 212. The outer shaft 202 is linear along the entire length in the illustrated embodiment. In an alternative embodiment, the inner shaft 204 and/or the outer shaft 202 may have a joint between two linear segments thereof, such that the two linear segments are angled relative to each other via the joint. The first end 212 is mechanically secured to a second component (e.g., Component B). In the first example described above, the second component is the accessory device 104. In the second example, the second component is the engine 102 (e.g., the gear box 108 thereof).

A mating segment 216 of the inner shaft 204 is located within the central channel 206 of the outer shaft 202. An exposed segment 218 of the inner shaft 204 protrudes from the outer shaft 202, beyond the second end 214 of the outer shaft 202, to the first end 208 of the inner shaft 204. The exposed segment 218 is mechanically coupled (e.g., secured) to the first component. The inner shaft 204 is rotationally coupled to the first component such that two components are physically connected and rotationally locked together. For example, rotational torque applied to the inner shaft 204 would exert torque on the first component at the coupling interface, and vice-versa. In general, components that are rotationally coupled may not be able to rotate relative to one another (beyond a negligible amount of lash due to tolerances). Furthermore, rotation of one component causes rotation of the rotationally coupled component. The outer shaft 202 is rotationally coupled to the second component such that two components are physically connected and rotationally locked together. A mating segment 220 of the outer shaft 202 surrounds the mating segment 218 of the inner shaft 204. An end segment 222 of the outer shaft 202 extends from the mating segment 220 to the first end 212 and is mechanically coupled (e.g., secured) to the second component. The outer shaft 202 is rotationally coupled to the second component such that two components are physically connected and rotationally locked together.

In the operational state of the drive shaft assembly 106, the inner shaft 204 is rotationally coupled to the outer shaft 202. For example, the mating segment 216 of the inner shaft 204 is rotationally locked to the mating segment 220 of the outer shaft 202. The drive shaft assembly 106 includes an interface medium 224 that is disposed within a circumferential clearance gap 226 between an exterior surface 228 of the inner shaft 204 and an interior surface 230 of the outer shaft 202. In the operational state, the interface medium 224 rotationally locks the shafts 202, 204 together by filling the clearance gap 226 and gripping both surfaces 228, 230 of the shafts 204, 202 to hold the surfaces 228, 230 together. The interface medium 224 in the operational state may not permit the inner shaft 204 and the outer shaft 202 to rotate relative to one another. The inner shaft 204 and the outer shaft 202 rotate as one unitary shaft member. As such, rotation of the inner shaft 204 by Component A causes the outer shaft 202 to rotationally drive Component B and/or vice-versa.

The inner shaft 204 may be coaxial with the outer shaft 202. For example, both shafts 202, 204 may be oriented along a central axis 232. In the operational state, the interface medium 224 may retain the coaxial orientations of the shafts 202, 204, and permit both shafts 202, 204 to rotate about the central axis 232.

Figure 3:
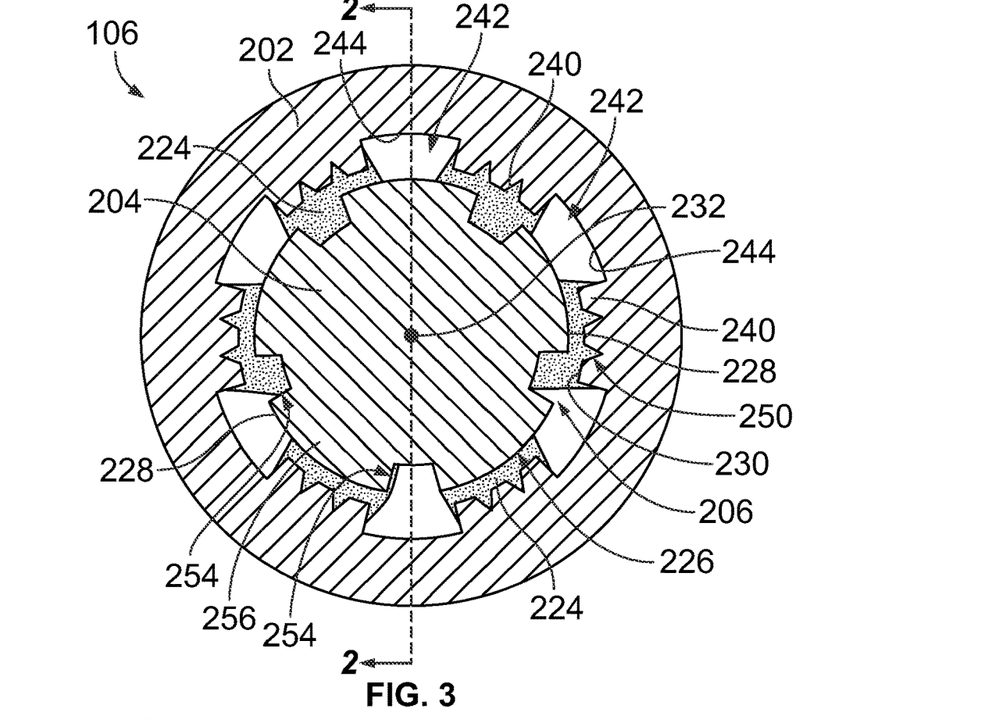
FIG. 3 is a cross-sectional view of the drive shaft assembly in an operational state according to an embodiment.

FIG. 3 is a cross-sectional view of the drive shaft assembly 106 in an operational state according to an embodiment. The cross-section in FIG. 3 is taken along line 3-3 in FIG. 2, and extends through the inner shaft 204, the outer shaft 202, and the interface medium 224.

In an embodiment, the outer shaft 202 includes centering lands 240 and cavities 242. The centering lands 240 radially project, from base surfaces 244 of the cavities 242, towards the central axis 232. The centering lands 240 may define the interior surface 230 of the outer shaft 202. The cavities 242 are circumferentially spaced between adjacent centering lands 240. The cavities 242 are open to the central channel 206 and radially extend from the central channel 206 to the base surfaces 244.

The inner shaft 204 is located within the central channel 206 of the outer shaft 202. The exterior surface 228 of the inner shaft 204 is located proximate to the centering lands 240, and defines the circumferential clearance gap 226 therebetween. The interface medium 224 is disposed within the circumferential clearance gap 226 and is located on both the interior surface 230 of the outer shaft 202 and the exterior surface 228 of the inner shaft 204. In an example, only a minor amount of the interface medium 224, if any, is located within the cavities 242. As shown in FIG. 3, the base surfaces 244 of the cavities 242 may be relatively void of the interface medium 224 in the operational state.

The interface medium 224 is a compound that has predictable melting properties, has a melting point within a temperature range that is indicative of an overheat condition of the accessory device, and, when in the solid phase, has sufficient adhesion and shear strength to reliably rotationally couple the inner shaft 204 to the outer shaft 202. For example, the predictable melting properties refers to the interface medium 224 reliably and repeatedly melting within a narrow variance range (e.g., 5 degree range or 10 degree range), regardless of time in use and batch inconsistencies. The melting point being in a temperature range indicative of an overheat condition refers to the melting point being marginally above (e.g., within 50 degrees, within 30 degrees, within 20 degrees, or the like) a normal operating temperature range for the accessory device 104. As such, the melting of the interface medium 224 can indicate that the temperature of accessory device 104 is above the normal operating temperature range (e.g., overheating). For example, if the normal operating temperature range has an upper limit of 300 degrees Fahrenheit (F), the interface medium 224 may be a compound that has a melting point within a range between 301 degrees F. and 400 degrees F. More specifically, the interface medium 224 may be selected to have a melting point that is at least 301 degrees F. and no greater than 350 degrees F. no greater than 330 degrees F., or even less. If available, an interface medium 224 that has a melting point of 310 degrees F. may be selected because the interface medium 224 would melt relatively soon after the overheat condition begins upon the temperature exceeding the 300 degree upper limit. The melting of the interface medium 224 transitions the drive shaft assembly 106 to the fault state, in which the accessory device 104 is decoupled from the engine 102. The adhesion and shear strength of the interface medium 224 refer to properties of the interface medium 224 that indicate the grip, or securing force, provided by the interface medium 224 to rotationally couple the two shafts 202, 204 together.

In an embodiment, the interface medium 224 is a metal solder material. The solder material may be an alloy. For example, the solder may be a eutectic solder with a melting point that is lower than those of the constituent metals in the alloy. The solder material may contain lead, such as a lead-tin alloy that optionally includes one or more additional metals. In other embodiments, the interface medium 224 may be or include an epoxy or other adhesive, a thermoplastic material, a wax, or the like, as long as the material composition allows the interface medium 224 to reliably rotationally couple the shafts 202, 204 in the solid state and reliably melt within a narrow temperature range that would provide a relatively early indication that the accessory device 104 is overheating.

In the illustrated embodiment, the outer shaft 202 has a spline profile along the interior surface 230. For example, the outer shaft 202 has multiple centering lands 240 that alternate with multiple cavities 242 along the circumference such that the centering lands 240 are spaced apart by intervening cavities 242. The centering lands 240 and the cavities 242 may define the spline profile. The centering lands 240 may have a uniform size and spacing (or pitch) between adjacent centering lands 240. Compared to a continuous, circular inner circumference, the spline profile of the outer shaft 202 may provide enhanced durability by increasing the shear strength of the interface medium 224 within the clearance gap 226. For example, the undulating contour of the interior surface 230 allows the interface medium 224 to set along surfaces angled transverse to the tangent lines. The contact between the interface medium 224 and various surfaces having different orientations enables the interface medium 224 to provide sufficient grip (e.g., shear strength and adhesion) to prevent the two shafts 202, 204 from rotationally uncoupling while the interface medium 224 is in the solid phase. For example, some of the interface medium 224 may set along the sides of the centering lands 240, which may increase the shear strength property of the interface medium 224. In an embodiment, the centering lands 240 may define a greater percentage of the circumference of the outer shaft 202 than the cavities 242. For example, the centering lands 240 may occupy 60% to 90% of the circumference, and the cavities 242 may occupy 40% to 10%, respectively, of the circumference. The centering lands 240 may define the majority of the circumference to limit the amount of axial tilt or wobble, vibration, noise, and/or the like between the inner shaft 204 and the outer shaft 202 when in the fault state, as described herein.

Optionally, the centering lands 240 may include notches 250 defined along the interior surface 230. The notches 250 are cutouts. The interface medium 224 may be received within the notches 250 during assembly. Once set, the interface medium 224 may contact surfaces of the notches 250, which may increase the shear strength of the interface medium 224 within the clearance gap 226. In an embodiment, the notches 250 in the centering lands 240 are significantly smaller in size (e.g., circumferential width, radial depth, volume, and/or the like) than the cavities 242 between the centering lands 240. In an alternative embodiment, the centering lands 240 may lack notches along the interior surface 230. For example, each centering land 240 may define a single uninterrupted arc that represents a portion of the interior surface 230.

In an embodiment, the inner shaft 204 may include one or more recesses 254 defined along the exterior surface 228. The inner shaft 204 has multiple recesses 254 in the illustrated example. The interface medium 224 may be deposited into at least some of the recesses 254 during assembly to increase the shear strength of the interface medium 224 within the clearance gap 226. The inner shaft 204 optionally includes a spline profile, with the recesses 254 being evenly spaced apart along the circumference of the inner shaft 204 and defining centering lands 256 between the recesses 254. The centering lands 256 are referred to herein as inner centering lands 256, and the centering lands 240 of the outer shaft 202 are referred to as outer centering lands 240. Although both shafts 202, 204 may include spline profiles, there is no nesting or meshing between the shafts 202, 204. For example, the inner centering lands 256 do not extend into the cavities 242, and the outer centering lands 240 do not extend into the recesses 254. The interface medium 224 may be the only component that rotationally couples the two shafts 202, 204. In an embodiment, the centering lands 256 define a greater percentage of the circumference of the inner shaft 204 than the recesses 254. For example, the centering lands 256 may occupy 60% to 90% of the circumference, and the recesses 254 may occupy 40% to 10%, respectively, of the circumference. The centering lands 256 may define the majority of the circumference to limit the amount of axial tilt or wobble, vibration, noise, and/or the like between the inner shaft 204 and the outer shaft 202 when in the fault state, as described herein.

The interface medium 224 may provide both adhesion and shear strength to rotationally couple the inner shaft 204 and the outer shaft 202 in the operational state. For example, the interface medium 224 may provide adhesion by adhering to the portions of the exterior surface 228 defined by the inner centering lands 256 and adhering to the portions of the interior surface 230 defined by the outer centering lands 240. The interface medium 224 may provide enhanced shear strength by contacting the angled surfaces of the inner centering lands 256 projecting from the recesses 254, contacting the angled surfaces of the outer centering lands 240 projecting from the cavities 242, and/or contacting the angled surfaces of the notches 250 within the outer centering lands 240. As described above, the cavities 242 may be at least partially void of the interface medium 224 in the operational state. For example, the interface medium 224 is deposited within the clearance gap 226 at positions that generally align with the outer centering lands 240. The interface medium 224, in the operational state, may grip the outer centering lands 240 without filling the cavities 242.

Figure 4:
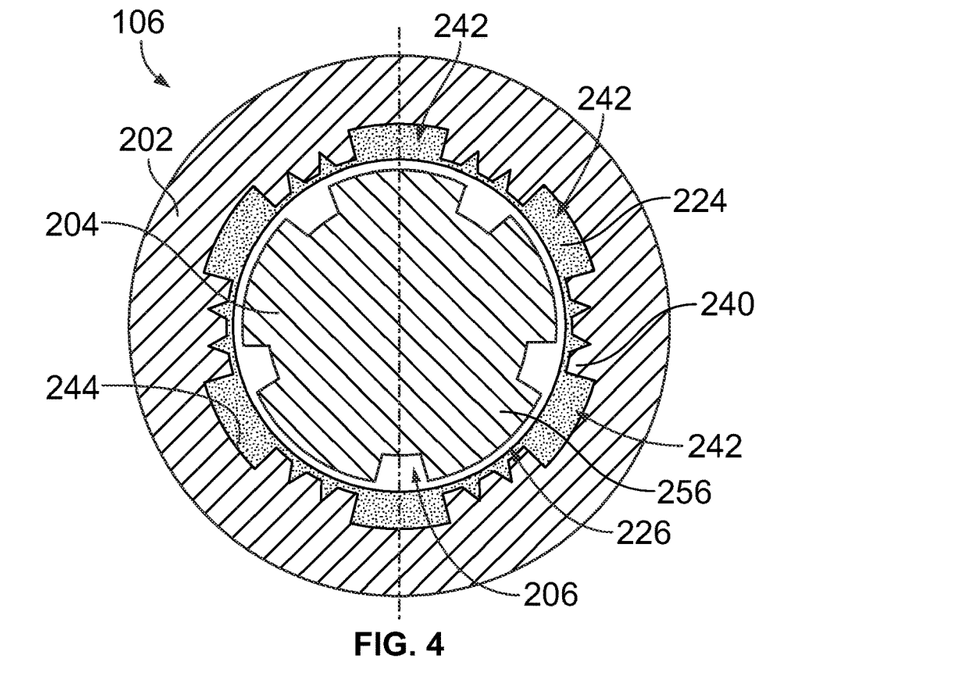
FIG. 4 is a cross-sectional view of the drive shaft assembly of FIG. 3 in a fault state.

FIG. 4 is a cross-sectional view of the drive shaft assembly 106 of FIG. 3 in a fault state. When the temperature within the drive shaft assembly 106 exceeds a threshold temperature, the drive shaft assembly 106 transitions from the operational state to the fault state. In an embodiment, the threshold temperature may be a melting point of the interface medium 224. At temperatures at and above the threshold temperature, the interface medium 224 at least partially melts. The melting of the interface medium 224 rotationally uncouples the shafts 202, 204, which disconnects the drive power to the accessory device 104.

The shafts 202, 204 may rotate at relatively fast speeds during operation, such as over 1000 rpms. The interface medium 224, now in a flowable state, may flow or otherwise migrate radially outward due to centrifugal force from the rotating shafts 202, 204. A significant amount of the interface medium 224 may migrate from within the narrow clearance gap 226 between the centering lands 240, 256 of the two shafts 202, 204 (as shown in FIG. 3) to within the cavities 242 of the outer shaft 202 (as shown in FIG. 4). For example, the amount of interface medium 224 located within the clearance gap 226 and bridging the clearance gap 226 to contact both shafts 202, 204 may be greater in the operational state than the fault state.

As the interface medium 224 melts and migrates away from the inner shaft 204, the interface medium 224 loses grip on the inner shaft 204. Eventually, the amount of grip provided by the interface medium 224 is insufficient to transfer the drive torque between the two shafts 202, 204 to power the accessory device 104, so the outer and inner shafts 202, 204 slip and rotationally uncouple. In an example in which the inner shaft 204 extends from the gear box 108 (shown in FIG. 1), the rotation of the inner shaft 204 by the gear box 108 no longer forces equal rotation of the outer shaft 202. The inner shaft 204 may rotate within the central channel 206 of the outer shaft 202. The outer shaft 202 which is connected to the accessory device 104 may be permitted to slow to a stop or to a rotational speed that is significantly less than the inner shaft 204. For example, the inner shaft 204 may exert a small amount of sliding frictional force on the outer shaft 202, which is insufficient to drive the internal components of the accessory device 104. In an alternative arrangement in which the outer shaft 202 extends from the gear box 108, the uncoupling allows the inner shaft 204 that is connected to the accessory device 104 to stop or at least substantially slow, even though the outer shaft 202 may continue to rotate as driven by the engine 102.

When the drive shaft assembly 106 is in the fault state, the accessory device 104 may not receive additional drive power (e.g., torque) from the engine 102. The accessory device 104 may cool. The temperature of the accessory device 104 may fall back into the normal operating temperature range. The temperature may fall quicker, to a greater extent, and/or using less active cooling than if the accessory device 104 continues to receive the drive power from the engine 102.

The drive shaft assembly 106 may be designed to contain the interface medium 224. The interface medium 224 may be a metallic compound that is in a molten, or flowable, state when the drive shaft assembly 106 transitions to the fault state. The centrifugal force may fling the molten metal outward, which could damage surrounding equipment if not contained. In an embodiment, the central channel 206 of the outer shaft 202 is sealed radially by the base surfaces 244 of the cavities 242. For example, the interface medium 224 flows into the cavities 242 and is contained along the base surfaces 244 and side surfaces of the cavities 242. Optionally, the drive shaft assembly 106 may include a containment housing 260, as shown in FIG. 2. The containment housing 260 may surround the shafts 202, 204 along a full 360 degrees. The containment housing 260 may collect any interface medium 224 that is emitted from the shafts 202, 204 to block the interface medium 224 from spraying onto surrounding equipment. Optionally, seal members, such as gaskets, bushings, and/or the like, may be installed at the axial ends of the overlap portion defined by the mating segments 216, 220 (shown in FIG. 2) of the inner and outer shafts 204, 202. The seal members may provide axial containment for the interface medium 224.

In the fault state, the outer and inner shafts 202, 204 are rotationally uncoupled but are still axially held together by the engine 102 and accessory device 104 such that the inner shaft 204 remains within the outer shaft 202. There is a risk that the engine-driven shaft (e.g., either 202 or 204) may start to wobble or tilt (e.g., whirl) along the axis of rotation relative to the accessory-coupled shaft. The wobble or tilt can cause damage to the shafts 202, 204, large vibration, and noise. In an embodiment, the drive shaft assembly 106 is designed to have a narrow clearance gap 226 to limit the amount of wobble or tilt permissible when the interface medium 224 has migrated away from the clearance gap 226 in the fault state. The outer centering lands 240 of the outer shaft 202 may be located sufficiently close to the inner shaft 204 (e.g., the inner centering lands 256) to generally maintain the two shafts 202, 204 having a parallel, coaxial orientation, even when rotationally uncoupled. For example, the tolerances of the centering lands 240, 256 may limit the amount of wobble or tilt (e.g., whirling) to acceptable limits. The acceptable limits may be selected by an operator or operating entity or may be designated by a standard or regulation.

In the fault state, the drive shaft assembly 106 may cool along with the accessory device 104. Eventually the temperature of the drive shaft assembly 106 may drop below the melting temperature of the interface medium 224. The interface medium 224 may start to harden as it transitions back to the solid phase. In an embodiment, the drive shaft assembly 106 is designed to not be reversible, meaning that the drive shaft assembly 106 does not automatically transition from the fault state back to the operational state. Once the shafts 202, 204 are rotationally uncoupled by the melting of the interface medium 224, solidification of the interface medium 224 due to the temperature drop does not rotationally re-couple the shafts 202, 204. For example, as shown in FIG. 4, the interface medium 224 has migrated away from the clearance gap 226. Even if some of the interface medium 224 remains in the clearance gap 226 and bridges the clearance gap 226 to grip the inner shaft 204 as the interface medium 224 solidifies, the adhesion and shear strength of this limited amount of interface medium 224 material would be lower than the normal drive force for the accessory device 104. As a result, this amount of interface medium 224 would shear (e.g., break), instead of rotationally locking the shafts 202, 204 together. Stated differently, the limited amount of interface medium 224 would not be able to transfer sufficient torque between the shafts 202, 204 to drive rotation of the internal components of the accessory device 104, so the interface medium 224 would shear. The sheared interface medium 224 that resolidifies within the clearance gap 226 may beneficially further narrow the clearance gap 226 which beneficially supports centering and stabilizing the rotation of the shafts 202, 204 in the fault state. For example, the resolidified interface medium 224 may help reduce wobble or tilt.

As described above, the melting of the interface medium 224 may permanently decouple the engine 102 from the accessory device 104. The drive shaft assembly 106 may function as a simple clutch that permanently disengages. The drive shaft assembly 106 may be a sacrificial component that fails before the engine 102 and/or the accessory device 104 experiences damage. The engine 102 may continue to drive the engine-driven shaft of the drive shaft assembly 106 for the remainder of a trip (e.g., a flight), although the accessory device 104 is not powered by the engine 102. Maintenance may be required to repair or replace the drive shaft assembly 106 to reestablish coupling between the engine 102 and the accessory device 104.

Figure 5:
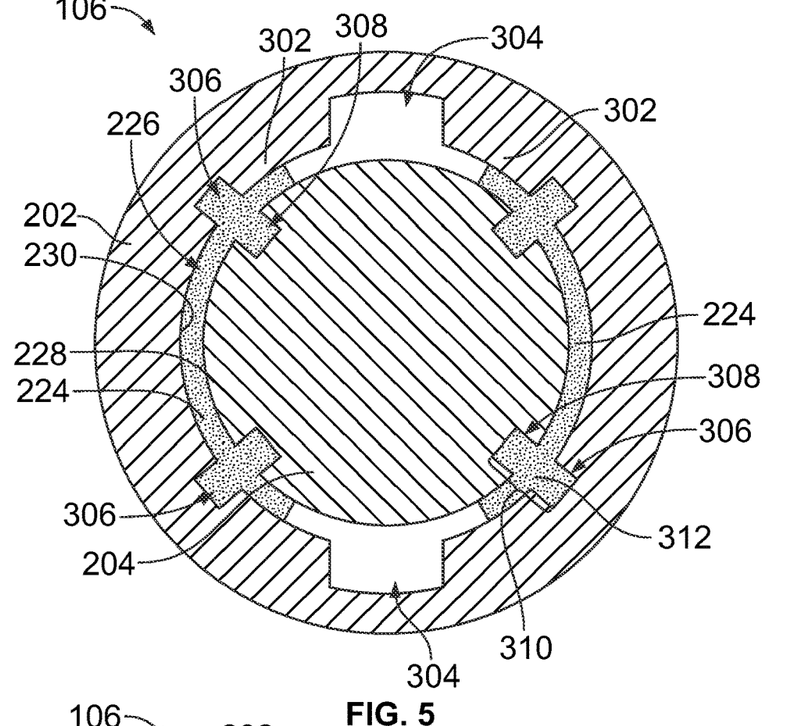
FIG. 5 is a cross-sectional view of the drive shaft assembly in the operational state according to a second embodiment.

FIG. 5 is a cross-sectional view of the drive shaft assembly 106 in the operational state according to a second embodiment. The cross-section in FIG. 5 is taken along line 3-3 in FIG. 2. The second embodiment is a variation of the first embodiment shown in FIGS. 3 and 4, and only modifies interior surface 230 of the outer shaft 202 and the exterior surface 228 of the inner shaft 204 relative to the first embodiment.

In FIG. 5, the outer shaft 202 includes two centering lands 302 and defines two cavities 304. The two cavities 304 may be spaced 180 degrees apart around the circumference of the interior surface 230. The cavities 304 may separate the centering lands 302 along the circumference. The outer shaft 202 may have a different number of cavities 304 and centering lands 302 in other embodiments. In an example, the centering lands 302 may define one or more grooves 306 along the interior surface 230. The grooves 306 are cutouts or recesses that are smaller than the cavities 304. In the illustrated embodiment, each centering land 302 defines two respective grooves 306.

The inner shaft 204 in FIG. 5 may have a relatively continuous and circular exterior surface 228 except for the presence of one or more grooves 308 that are open along the exterior surface 228. The grooves 308 may have a similar size as the grooves 306. The grooves 308 form keyways 310 with the grooves 306 of the outer shaft 202. For example, the number and positioning of the grooves 308 along the exterior surface 228 may generally match the number and positioning of the grooves 306 along the interior surface 230. During production of the drive shaft assembly 106, the shafts 202, 204 may be rotationally oriented such that the grooves 306 of the outer shaft 202 align with and oppose corresponding grooves 308 of the inner shaft 204 to form one or more keyways 310.

The drive shaft assembly 106 may be assembled such that the interface medium 224 is located within the clearance gap 226 between the shafts 202, 204 to rotationally couple the shafts 202, 204. Optionally, little if any interface medium 224 is deposited into the cavities 304 such that the cavities 304 are relatively open in the operational state. The interface medium 224 may fill at least a majority of the keyways 310 defined by the grooves 306, 308. The solidified interface medium 224 within the keyways 310 function as keys 312 that rotationally lock the shafts 202, 204 together. The keys increase the shear strength of the interface medium 224. Although four keys 312 and keyways 310 are shown in FIG. 5, the drive shaft assembly 106 may have a different number in other embodiments.

Figure 6:
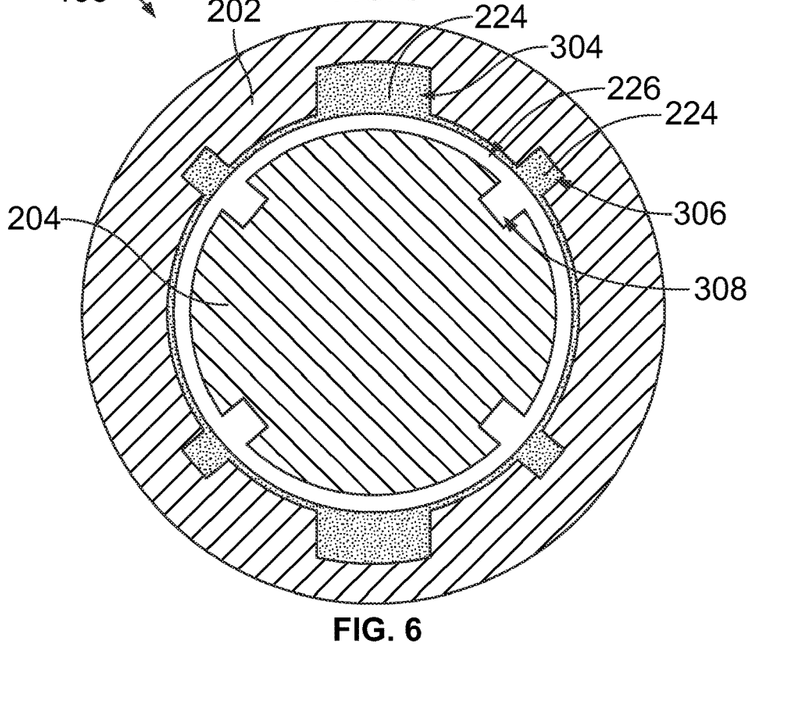
FIG. 6 is a cross-sectional view of the drive shaft assembly of FIG. 5 in the fault state.

FIG. 6 is a cross-sectional view of the drive shaft assembly 106 of FIG. 5 in the fault state. When the interface medium 224 melts, the interface medium 224 may migrate radially outward into the recesses of the outer shaft 202. For example, the interface medium 224 may flow into the cavities 304. Some interface medium 224 may remain within the grooves 306 of the outer shaft 202, although the grooves 308 of the inner shaft 204 may be generally open. Little, if any, interface medium 224 is present within the clearance gap 226 and bridges the clearance gap 226 to grip the inner shaft 204. As a result, the inner shaft 204 and the outer shaft 202 rotationally uncouple, as described above with reference to FIG. 4.

Figure 7:
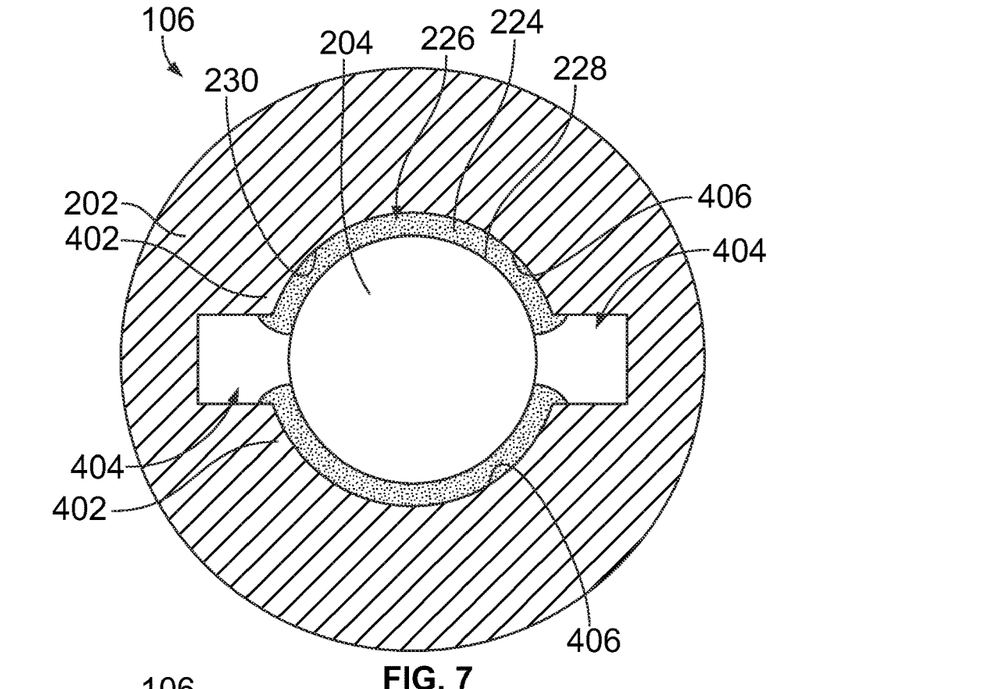
FIG. 7 is a cross-sectional view of the drive shaft assembly in the operational state according to a third embodiment.

FIG. 7 is a cross-sectional view of the drive shaft assembly 106 in the operational state according to a third embodiment. The cross-section in FIG. 7 is taken along line 3-3 in FIG. 2. The third embodiment is a variation of the second embodiment shown in FIGS. 5 and 6. For example, the third embodiment represents the second embodiment without the keyways 310. The exterior surface 228 of the inner shaft 204 forms an unbroken (e.g., continuous) circle that is free of cutouts and projections. The interior surface 230 of the outer shaft 202 includes two centering lands 402 and two cavities 404, similar to FIG. 5. Unlike FIG. 5, the centering lands 402 form unbroken arcs 406 that are free of cutouts and projections. In the operational state, the interface medium 224 is disposed in the clearance gap 226 between the exterior surface 228 and the arcs 406 of the centering lands 402. The cavities 404 are relatively open and devoid of the interface medium 224. The interface medium 224 rotationally couples the shafts 202, 204 due to adhesion and shear strength along the contact surfaces.

Figure 8:
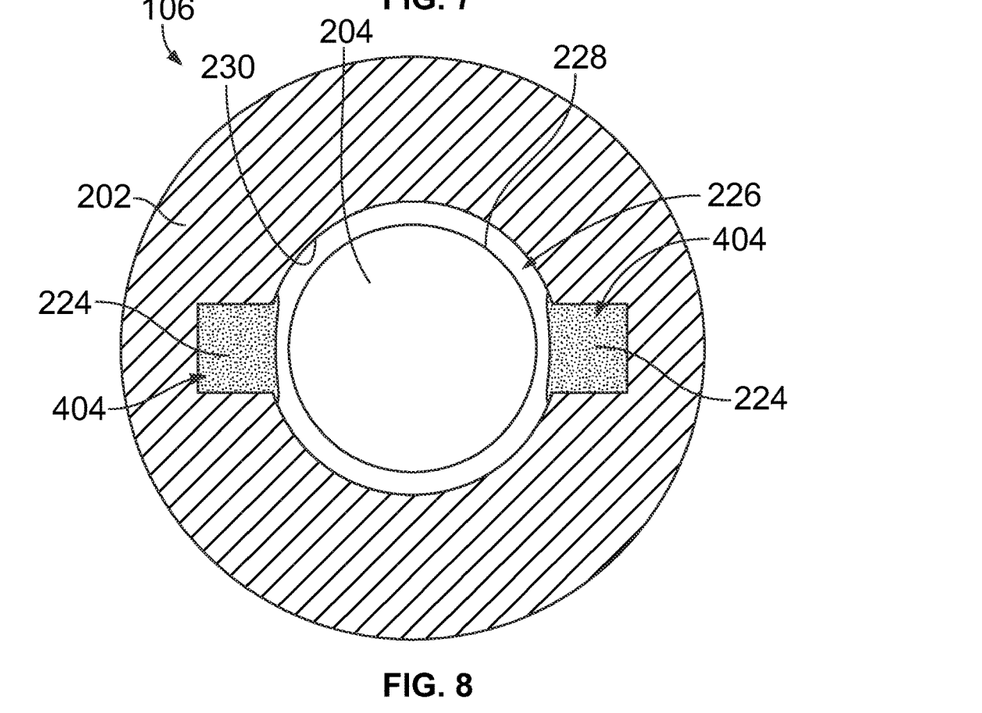
FIG. 8 is a cross-sectional view of the drive shaft assembly of FIG. 7 in the fault state.

FIG. 8 is a cross-sectional view of the drive shaft assembly 106 of FIG. 7 in the fault state. When the interface medium 224 melts, the interface medium 224 migrates from the clearance gap 226 radially outward into the cavities 404. The inner shaft 204 and the outer shaft 202 rotationally uncouple. Any material of the interface medium 224 that remains within the clearance gap 226 either does not contact the inner shaft 204 or shears upon resolidifying, as described above with reference to FIG. 4.

Figure 9:
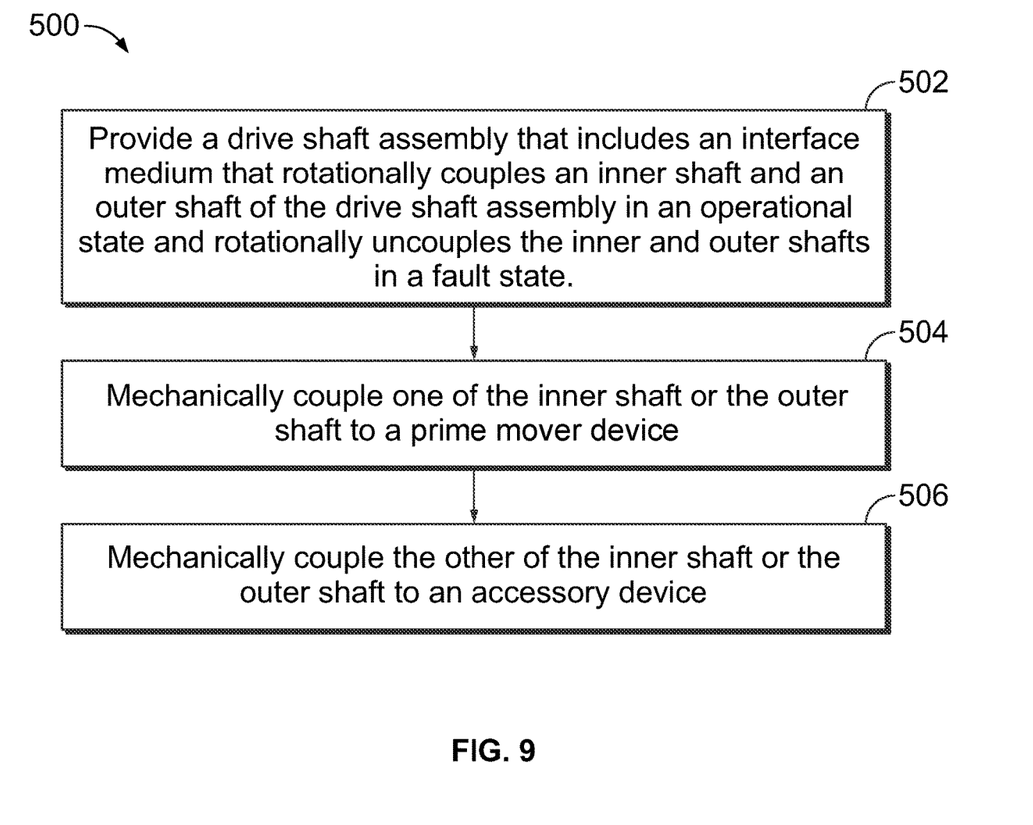
FIG. 9 is a flow chart of a method for selectively coupling a prime mover device to an accessory device, according to an embodiment.

FIG. 9 is a flow chart 500 of a method for selectively coupling a prime mover device and an accessory device according to an embodiment. The method may be performed using the drive shaft assembly 106 according to one or more of the embodiments shown in FIGS. 2 through 8. The method optionally may include at least one additional step than shown, at least one fewer step than shown, and/or at least one different step than shown in FIG. 9.

At step 502, a drive shaft assembly 106 is provided. The drive shaft assembly 106 may include an outer shaft 202, an inner shaft 204, and an interface medium 224. The outer shaft 202 may define a central channel 206. The inner shaft 204 may extend into the central channel 206 and may define a clearance gap 226 between an interior surface 230 of the outer shaft 202 and an exterior surface 228 of the inner shaft 204. The interface medium 224 may be disposed in the clearance gap 226 and may rotationally couple the outer shaft 202 and the inner shaft 204 in an operational state of the drive shaft assembly 106.

At step 504, the inner shaft 204 or the outer shaft 202 is mechanically coupled to a prime mover device. In the illustrated example, the prime mover device is an engine 102. The inner shaft 204 or the outer shaft 202 is mechanically coupled to a gear box 108 of the engine 102. The engine 102 may be onboard a vehicle. For example, the engine 102 may be a gas turbine engine onboard an aircraft.

At step 506, the other of the inner shaft 204 or the outer shaft 202 is mechanically coupled to an accessory device 104. For example, if the inner shaft 204 is coupled to the gear box 108, then the outer shaft 202 is coupled to the accessory device 104. Conversely, if the outer shaft 202 is coupled to the gear box 108, the inner shaft 204 is coupled to the accessory device 104. The drive shaft assembly 106 may provide rotational drive power from the gear box 108 to the accessory device 104 when the drive shaft assembly 106 is in the operational state. For example, the drive shaft assembly 106 transmits rotational torque exerted by the gear box 108 to the accessory device 104. The accessory device 104 may be a pump, a compressor, a generator, or the like. In an example, the inner shaft 204 or the outer shaft 202 may be mechanically coupled to a hydraulic pump that represents the accessory device 104.

In response to a temperature of the drive shaft assembly 106 exceeding a threshold temperature, the interface medium 224 may at least partially melt and rotationally uncouple the outer shaft 202 and the inner shaft 204 in a fault state of the drive shaft assembly 106. When in the fault state, the drive shaft assembly 106 may no longer transmit the rotational torque to the accessory device 104.

Optionally, providing the drive shaft assembly 106 may include forming the outer shaft 202 to include one or more cavities 242 that are open to the clearance gap 226 and extend radially outward from the clearance gap 226 to respective base surfaces 244 of the one or more cavities 242. At least a portion of the interface medium 224 may flow from the clearance gap 226 into the one or more cavities 242 in the fault state and may be contained within the one or more cavities 242. Optionally, providing the drive shaft assembly 106 may include obtaining the interface medium 224 as a metallic solder that has a melting point that is within 30 degrees above an upper limit of a normal operating temperature range for the accessory device 104. Optionally, the method may include installing a containment housing 260 to surround the inner and outer shafts 204, 202 of the drive shaft assembly 106 between the gear box 108 and the accessory device 104.

Further, the disclosure comprises examples according to the following clauses:

Clause 1. A drive shaft assembly 106 comprising:
an outer shaft 202 that defines a central channel 206;
an inner shaft 204 extending into the central channel of the outer shaft 202 and defining a clearance gap 226 between an interior surface 230 of the outer shaft 202 and an exterior surface 228 of the inner shaft 204; and
an interface medium 224 disposed in the clearance gap 226 and configured to rotationally couple the outer shaft 202 and the inner shaft 204 in an operational state of the drive shaft assembly 106,
wherein, in response to a temperature of the drive shaft assembly 106 exceeding a threshold temperature, the interface medium 224 is configured to at least partially melt and rotationally uncouple the outer shaft 202 and the inner shaft 204 in a fault state of the drive shaft assembly 106.

Clause 2. The drive shaft assembly 106 of Clause 1, wherein the outer shaft 202 includes one or more cavities 242, 304, 404 that are open to the clearance gap 226 and extend radially outward from the clearance gap 226 to respective base surfaces of the one or more cavities 242, 304, 404, and wherein at least a portion of the interface medium 224 is configured to flow from the clearance gap 226 into the one or more cavities 242, 304, 404 in the fault state.

Clause 3. The drive shaft assembly 106 of Clause 2, wherein the one or more cavities 242, 304, 404 are void of the interface medium 224 when the drive shaft assembly 106 is in the operational state.

Clause 4. The drive shaft assembly 106 of Clause 2, wherein the one or more cavities 242, 304, 404 contain the portion of the interface medium 224 that flows into the one or more cavities 242, 304, 404 to block the interface medium 224 from exiting the central channel 206 of the outer shaft 202.

Clause 5. The drive shaft assembly 106 of any of Clauses 1-4, wherein an end segment 222 of the outer shaft 202 is mechanically secured to one of a gear box 108 of an engine 102 or an accessory device 104, and an exposed segment of the inner shaft 204 that projects from the outer shaft 202 is mechanically secured to the other of the gear box 108 or the accessory device 104, and wherein rotational torque exerted by the gear box 108 is transmitted via the inner and outer shafts 204, 202 to the accessory device 104 in the operational state, and the rotational torque is not transmitted to the accessory device 104 in the fault state.

Clause 6. The drive shaft assembly 106 of Clause 5, wherein the accessory device 104 is a hydraulic pump.

Clause 7. The drive shaft assembly 106 of any of Clauses 1-6, wherein the outer shaft 202 includes multiple centering lands 240 that define the interior surface 230 of the outer shaft 202, wherein the centering lands 240 are spaced apart along a circumference of the interior surface 230 by cavities 242, 304, 404 that are open to the clearance gap 226 and extend radially outward from the clearance gap 226, and wherein the centering lands 240 define notches 250 along the interior surface 230 that are smaller than the cavities 242, 304, 404, and a portion of the interface medium 224 is disposed within the notches 250 in the operational state.

Clause 8. The drive shaft assembly 106 of any of Clauses 1-7, wherein the inner shaft 204 includes multiple centering lands 240 that define the exterior surface 228 of the inner shaft 204, wherein the centering lands 240 are spaced apart along a circumference of the exterior surface 228 by recesses 254 that are open to the clearance gap 226 and extend radially inward from the clearance gap 226, and wherein a portion of the interface medium 224 is disposed within the recesses 254 in the operational state.

Clause 9. The drive shaft assembly 106 of any of Clauses 1-8, wherein the outer shaft 202 defines at least a first groove along the interior surface 250 of the outer shaft 202 and extending radially outward from the clearance gap 226, wherein the inner shaft 204 defines at least a second groove along the exterior surface 228 of the inner shaft 204 and extending radially inward from the clearance gap 226, and wherein, in the operational state, the at least a second groove aligns with the at least a first groove to define a keyway and a solid segment 224 of the interface medium is disposed within the keyway.

Clause 10. The drive shaft assembly 106 of any of Clauses 1-9, wherein the interface medium 224 is a eutectic solder.

Clause 11. The drive shaft assembly 106 of any of Clauses 1-10, wherein the interface medium 224 has a melting point that is within 30 degrees above an upper limit of a normal operating temperature range for an accessory device 104 that is coupled to the drive shaft assembly 106.

Clause 12. A method for selectively coupling a prime mover device to an accessory device 104, the method comprising:
- providing a drive shaft assembly 106 that includes an outer shaft 202, an inner shaft 204, and an interface medium 224, wherein the outer shaft 202 defines a central channel 206, wherein the inner shaft 204 extends into the central channel 206 of the outer shaft 202 and defines a clearance gap 226 between an interior surface 230 of the outer shaft 202 and an exterior surface 228 of the inner shaft 204, and wherein the interface medium 224 is disposed in the clearance gap 226 and configured to rotationally couple the outer shaft 202 and the inner shaft 204 in an operational state of the drive shaft assembly 106;
- mechanically coupling one of the inner shaft 204 or the outer shaft 202 to the prime mover device; and
- mechanically coupling the other of the inner shaft 204 or the outer shaft 202 to the accessory device 104, wherein, in the operational state, rotational torque exerted by the gear box 108 is transmitted via the drive shaft assembly 106 to the accessory device 104,
- wherein, in response to a temperature of the drive shaft assembly 106 exceeding a threshold temperature, the interface medium 224 is configured to at least partially melt and rotationally uncouple the outer shaft 202 and the inner shaft 204, such that the drive shaft assembly 106 no longer transmits the rotational torque to the accessory device 104, in a fault state of the drive shaft assembly 106.

Clause 13. The method of Clause 12, wherein said mechanically coupling the other of the inner shaft 204 or the outer shaft 202 to the accessory device 104 includes coupling the inner shaft 204 or the outer shaft 202 to a hydraulic pump that represents the accessory device 104.

Clause 14. The method of Clause 12 or Clause 13, wherein said mechanically coupled one of the inner shaft 204 or the outer shaft 202 to the prime mover device comprises mechanically coupling the inner shaft 204 or the outer shaft 202 to a gear box 108 of a gas turbine engine 102 onboard an aircraft.

Clause 15. The method of any of Clauses 12-14, further comprising installing a containment housing 260 to surround the inner and outer shafts 204, 202 of the drive shaft assembly 106 between the prime mover device and the accessory device 104.

Clause 16. The method of any of Clauses 12-15, wherein said providing the drive shaft assembly 106 includes forming the outer shaft 202 to include one or more cavities 242, 304, 404 that are open to the clearance gap 226 and extend radially outward from the clearance gap 226 to respective base surfaces 244 of the one or more cavities 242, 304, 404, wherein at least a portion of the interface medium 224 flows from the clearance gap 226 into the one or more cavities 242, 304, 404 in the fault state and is contained within the one or more cavities 242, 304, 404.

Clause 17. The method of any of Clauses 12-16, wherein said providing the drive shaft assembly 106 includes obtaining the interface medium 224 as a metallic solder that has a melting point that is within 30 degrees above an upper limit of a normal operating temperature range for the accessory device 104.

Clause 18. An engine drive system 100 comprising:
- a fuel combustion engine 102 including a gear box 108;
- an accessory device 104; and
- a drive shaft assembly 106 comprising:
    - an outer shaft 202 that defines a central channel 206 therethrough, wherein the outer shaft 202 is mechanically connected to one of the gear box 108 or the accessory device 104;
    - an inner shaft 204 extending into the central channel 206 of the outer shaft 202 and defining a clearance gap 226 between an interior surface 230 of the outer shaft 202 and an exterior surface 228 of the inner shaft 204, wherein the inner shaft 204 is mechanically connected to the other of the gear box 108 or the accessory device 104, and wherein the outer shaft 202 includes cavities 242, 304, 404 that are open to the clearance gap 226 and extend radially outward from the clearance gap 226 to respective base surfaces 244 of the cavities 242, 304, 404; and
    - an interface medium 224 disposed in the clearance gap 226 and configured to rotationally couple the outer shaft 202 and the inner shaft 204 in an operational state of the drive shaft assembly 106,
- wherein in response to a temperature of the drive shaft assembly 106 exceeding a threshold temperature, at least a portion of the interface medium 224 is configured to flow from the clearance gap 226 into the cavities 242, 304, 404, which rotationally uncouples the outer shaft 202 and the inner shaft 204 in a fault state of the drive shaft assembly 106.

Clause 19. The engine drive system 100 of Clause 18, wherein the outer shaft 202 includes multiple centering lands 240 that define the interior surface 230 of the outer shaft 202 and are spaced apart by the cavities 242, 304, 404, wherein the centering lands 240 define notches 250 along the interior surface 230 that are smaller than the cavities 242, 304, 404, and wherein the notches 250 are at least partially filled by the interface medium 224 in the operational state.

Clause 20. The engine drive system 100 of Clause 18 or Clause 19, wherein the outer shaft 202 defines at least a first groove along the interior surface 230 of the outer shaft 202 and extending radially outward from the clearance gap 226, wherein the inner shaft 204 defines at least a second groove along the exterior surface 228 of the inner shaft 204 and extending radially inward from the clearance gap 226, and wherein, in the operational state, the at least a second groove aligns with the at least a first groove to define a keyway and a solid segment of the interface medium 224 is disposed within the keyway.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A drive shaft assembly comprising:
an outer shaft that defines a central channel, wherein the outer shaft includes one or more cavities;
an inner shaft extending into the central channel of the outer shaft and defining a clearance gap between an interior surface of the outer shaft and an exterior surface of the inner shaft, wherein the one or more cavities are open to the clearance gap and extend radially outward from the clearance gap to respective base surfaces of the one or more cavities; and
an interface medium disposed in the clearance gap and configured to rotationally couple the outer shaft and the inner shaft in an operational state of the drive shaft assembly,
wherein, in response to a temperature of the drive shaft assembly exceeding a threshold temperature, the interface medium is configured to at least partially melt and rotationally uncouple the outer shaft and the inner shaft in a fault state of the drive shaft assembly, and wherein at least a portion of the interface medium is configured to flow from the clearance gap into the one or more cavities in the fault state.

2. The drive shaft assembly of claim 1, wherein the one or more cavities are void of the interface medium when the drive shaft assembly is in the operational state.

3. The drive shaft assembly of claim 1, wherein the one or more cavities contain the portion of the interface medium that flows into the one or more cavities.

4. The drive shaft assembly of claim 1, wherein an end segment of the outer shaft is mechanically secured to one of a gear box of an engine or an accessory device, and an exposed segment of the inner shaft that projects from the outer shaft is mechanically secured to the other of the gear box or the accessory device, and wherein rotational torque exerted by the gear box is transmitted via the inner and outer shafts to the accessory device in the operational state, and the rotational torque is not transmitted to the accessory device in the fault state.

5. The drive shaft assembly of claim 4, wherein the accessory device is a hydraulic pump.

6. The drive shaft assembly of claim 1, wherein the outer shaft includes multiple centering lands that define the interior surface of the outer shaft, wherein the centering lands are spaced apart along a circumference of the interior surface by cavities that are open to the clearance gap and extend radially outward from the clearance gap, and wherein the centering lands define notches along the interior surface that are smaller than the cavities, and a portion of the interface medium is disposed within the notches in the operational state.

7. The drive shaft assembly of claim 1, wherein the inner shaft includes multiple centering lands that define the exterior surface of the inner shaft, wherein the centering lands are spaced apart along a circumference of the exterior surface by recesses that are open to the clearance gap and extend radially inward from the clearance gap, and wherein a portion of the interface medium is disposed within the recesses in the operational state.

8. The drive shaft assembly of claim 1, wherein the outer shaft defines at least a first groove along the interior surface of the outer shaft and extending radially outward from the clearance gap, wherein the inner shaft defines at least a second groove along the exterior surface of the inner shaft and extending radially inward from the clearance gap, and wherein, in the operational state, the at least a second groove aligns with the at least a first groove to define a keyway and a solid segment of the interface medium is disposed within the keyway.

9. The drive shaft assembly of claim 1, wherein the interface medium is a eutectic solder.

10. The drive shaft assembly of claim 1, wherein the interface medium has a melting point that is within 30 degrees Fahrenheit (F) above an upper limit of a normal operating temperature range for an accessory device that is coupled to the drive shaft assembly.

11. A method for selectively coupling a prime mover device to an accessory device, the method comprising:
providing a drive shaft assembly that includes an outer shaft, an inner shaft, and an interface medium, wherein the outer shaft defines a central channel, wherein the inner shaft extends into the central channel of the outer shaft and defines a clearance gap between an interior surface of the outer shaft and an exterior surface of the inner shaft, wherein the interface medium is disposed in the clearance gap and configured to rotationally couple the outer shaft and the inner shaft in an operational state of the drive shaft assembly, and wherein said providing the drive shaft assembly includes forming the outer shaft to include one or more cavities that are open to the clearance gap and extend radially outward from the clearance gap to respective base surfaces of the one or more cavities;
mechanically coupling one of the inner shaft or the outer shaft to the prime mover device; and mechanically coupling the other of the inner shaft or the outer shaft to the accessory device, wherein, in the operational state, rotational torque exerted by the prime mover device is transmitted via the drive shaft assembly to the accessory device, wherein, in response to a temperature of the drive shaft assembly exceeding a threshold temperature, the interface medium is configured to at least partially melt and rotationally uncouple the outer shaft and the inner shaft, such that the drive shaft assembly no longer transmits the rotational torque to the accessory device, in a fault state of the drive shaft assembly, and wherein at least a portion of the interface medium flows from the clearance gap into the one or more cavities in the fault state and is contained within the one or more cavities.

12. The method of claim 11, wherein said mechanically coupling the other of the inner shaft or the outer shaft to the accessory device includes coupling the inner shaft or the outer shaft to a hydraulic pump that represents the accessory device.

13. The method of claim 11, wherein said mechanically coupled one of the inner shaft or the outer shaft to the prime mover device comprises mechanically coupling the inner shaft or the outer shaft to a gear box of a gas turbine engine onboard an aircraft.

14. The method of claim 11, further comprising installing a containment housing to surround the inner and outer shafts of the drive shaft assembly between the prime mover device and the accessory device.

15. The method of claim 11, wherein said providing the drive shaft assembly includes obtaining the interface medium as a metallic solder that has a melting point that is within 30 degrees Fahrenheit (F) above an upper limit of a normal operating temperature range for the accessory device.

16. An engine drive system comprising:
a fuel combustion engine including a gear box;
an accessory device; and
a drive shaft assembly comprising:
an outer shaft that defines a central channel therethrough, wherein the outer shaft is mechanically connected to one of the gear box or the accessory device;
an inner shaft extending into the central channel of the outer shaft and defining a clearance gap between an interior surface of the outer shaft and an exterior surface of the inner shaft, wherein the inner shaft is mechanically connected to the other of the gear box or the accessory device, and wherein the outer shaft includes cavities that are open to the clearance gap and extend radially outward from the clearance gap to respective base surfaces of the cavities; and
an interface medium disposed in the clearance gap and configured to rotationally couple the outer shaft and the inner shaft in an operational state of the drive shaft assembly,
wherein in response to a temperature of the drive shaft assembly exceeding a threshold temperature, at least a portion of the interface medium is configured to flow from the clearance gap into the cavities, which rotationally uncouples the outer shaft and the inner shaft in a fault state of the drive shaft assembly.

17. The engine drive system of claim 16, wherein the outer shaft includes multiple centering lands that define the interior surface of the outer shaft and are spaced apart by the cavities, wherein the centering lands define notches along the interior surface that are smaller than the cavities, and wherein the notches are at least partially filled by the interface medium in the operational state.

18. The engine drive system of claim 16, wherein the outer shaft defines at least a first groove along the interior surface of the outer shaft and extending radially outward from the clearance gap, wherein the inner shaft defines at least a second groove along the exterior surface of the inner shaft and extending radially inward from the clearance gap, and wherein, in the operational state, the at least a second groove aligns with the at least a first groove to define a keyway and a solid segment of the interface medium is disposed within the keyway.

19. The engine drive system of claim 16, wherein the cavities are void of the interface medium when the drive shaft assembly is in the operational state.

20. The engine drive system of claim 16, wherein the cavities contain the portion of the interface medium that flows into the cavities.

* * * * *